US008428450B2

(12) United States Patent
Saxena

(10) Patent No.: US 8,428,450 B2
(45) Date of Patent: Apr. 23, 2013

(54) INTEGRATED OPTICAL MODULE

(75) Inventor: Kuldeep Kumar Saxena, Singapore (SG)

(73) Assignee: Lite-On Singapore Pte. Ltd., Midview (SG)

( * ) Notice: Subject to any disclaimer, the term of this patent is extended or adjusted under 35 U.S.C. 154(b) by 71 days.

(21) Appl. No.: 13/171,373

(22) Filed: Jun. 28, 2011

(65) Prior Publication Data

US 2013/0004030 A1   Jan. 3, 2013

(51) Int. Cl.
*G03B 29/00* (2006.01)

(52) U.S. Cl.
USPC .......................................................... 396/15

(58) Field of Classification Search ............. 395/15; 348/77; 396/15
See application file for complete search history.

(56) References Cited

U.S. PATENT DOCUMENTS

| | | | |
|---|---|---|---|
| 4,537,484 A * | 8/1985 | Fowler et al. ................ | 396/15 |
| 8,170,300 B2 * | 5/2012 | Yamamoto et al. .......... | 382/124 |
| 2008/0260365 A1 * | 10/2008 | Chang ............................ | 396/15 |
| 2010/0134610 A1 * | 6/2010 | Kono et al. ..................... | 348/77 |
| 2010/0315498 A1 * | 12/2010 | Choi et al. ..................... | 348/77 |
| 2011/0058027 A1 * | 3/2011 | Hsu et al. ....................... | 348/77 |
| 2011/0128361 A1 * | 6/2011 | Sato .............................. | 348/77 |
| 2011/0254941 A1 * | 10/2011 | Kiyomizu et al. ............. | 348/77 |
| 2012/0105614 A1 * | 5/2012 | Wu et al. ........................ | 348/77 |
| 2012/0154558 A1 * | 6/2012 | Ahn et al. ...................... | 348/54 |
| 2012/0205586 A1 * | 8/2012 | Ren et al. .................. | 252/301.36 |

* cited by examiner

*Primary Examiner* — WB Perkey

(74) *Attorney, Agent, or Firm* — Li & Cai Intellectual Property (USA) Office

(57) ABSTRACT

The instant disclosure relates to an integrated optic module for adapting in a finger sensing apparatus. The integrated optic module comprises an illumination portion including a light guiding array arranged to direct incident light from the electronic module toward the window module at a predetermined angle of incidence and an imaging portion having an imaging lens array arranged thereon to direct reflected light from the window module toward the electronic module for photo imaging. The micro-lens array includes an elongated recognition unit having a row axis substantially normal toward the light guiding array and a navigation unit adjoining the recognition unit and offsetting the row axis thereof. The optic module mediates a window module and an electronic module to provide both finger navigation and fingerprint recognition capabilities.

23 Claims, 3 Drawing Sheets

INTEGRATED OPTICAL MODULE

BACKGROUND OF THE INVENTION

1. Field of the Invention

The instant disclosure relates generally to an integrated optical module adaptable in a finger sensing device, and pertains particularly to an integrated optical module adaptable in a fingerprint imaging device for finger navigation and biometric scanning purposes.

2. Description of Related Art

While modern devices share a common design trend toward miniaturization in physical size, their functionality has grown tremendously sophisticated and diversified. As a result, conventional human interface devices (HID), such as mouse and keyboard, are often rendered inadequate when adapted . Constant efforts have been devoted to finding a precise and intuitive miniaturized control interface capable of enabling intimate human-machine interaction. Particularly, as these personalized electronic devices are deeply integrated into modern daily life, they are expected to be operated under a variety of conditions. Therefore, the HID thereof should not only be precise and sensitive but also compact and reliable.

Moreover, Human fingerprint is a unique biometric feature that has been long used for identification purposes. As modern electronics become increasingly personalized, the data/information stored thereon are often invaluable. It is desirable to incorporate on the electronic device a security measure to safeguard the information stored thereon and/or to disable the operation thereof in the event of loss or theft. Therefore, it is desirable to incorporate biometric scanning capabilities into modern electronic devices to regulate access and ensure security.

Optical finger navigation (OFN) technology possesses the above desirable attributes in terms of precision, compactness, and reliability. Furthermore, OFN devices can be configured to perform fingerprint scanning functions suitable for biometric recognition applications. Particularly, an OFN device combines the sensitivity and the reliability of a well-developed optical mouse yet poses far less spatial constraint in physical implementation.

On the other hand, as modern electronic devices become growingly personalized and the data/ information stored therein being increasingly invaluable, it is desirable to incorporate security measures to safeguard the information and/or to restrict/ disable the operation of the device, particularly in the event of loss or theft. Human fingerprint is a unique biometric feature that has been long used for identification purposes. Therefore, it is desirable to incorporate biometric scanning capabilities into modern electronic devices to regulate access and ensure security.

However, OFN devices of conventional design often employ separately arranged illumination optical and imaging optical components around the sensing surface, which occupies precious space. Also, a separated optical arrangement may generate less uniformed illumination output across a wide area of the sensing surface, which may reduce the performance of the OFN device. Moreover, finger navigation and fingerprint recognition operations require optical components of different features. Particularly, for fingerprint recognition operations, it is often desirable to employ optical modules that are configured to match with a linear photo detector array. On the other hand, for finger navigation applications, the adaptation of optical modules configured to match with an area detector array is preferred. Therefore, merely placing separate optical components that are suitable for each individual mode of operation in the same device is inefficient from both a cost effectiveness aspect and a space utilization aspect.

Therefore, it is desirable to have an integrated optical mechanism capable of supporting both finger recognition and finger navigation operations and at the same time adaptable in a low-profile package. Furthermore, it is desirable to have a cost-effective and compact finger sensing unit capable of performing both fingerprint recognition and finger navigation functions for adaptation in small portable electronic devices.

SUMMARY OF THE INVENTION

However, OFN devices of conventional design often employ separately arranged illumination and imaging optical components around the sensing surface thereof, which occupy precious space. Also, a separated optical arrangement tends to generate less uniformed illumination output across a wide area of the sensing surface, which may negatively affect the performance of the OFN device. Moreover, finger navigation and fingerprint recognition operations generally require optical components of different features. Particularly, for fingerprint recognition operations, it is often desirable to employ optical modules that are configured to match with a wide-spanning linear photo detector array. On the other hand, for finger navigation applications, the adaptation of optical modules configured to match with a point-concentrated area detector arrays is preferred. Therefore, merely placing separate optical components that are suitable for each individual mode of operation in a single device is inefficient from both a cost effectiveness aspect and a space utilization aspect.

Another aspect of the instant disclosure provides a finger sensing apparatus utilizing an integrated optical module configured to enable both finger navigation and fingerprint recognition modes of operation. The finger sensing apparatus comprises a window module having a contact surface against which a finger is placed for scanning; an electronic module comprising a light source and a light sensor correspondingly arranged toward the window module; and an integrated optic module mediating the window module and the electronic module. The optic module includes an illumination portion having an light guiding array arranged to direct incident light from the light source toward the window module at a predetermined angle of incidence, and an imaging portion having an imaging lens array arranged thereon to direct reflected light from the window module (off a scanned object) toward the light sensor. The micro-lens array includes an elongated recognition lens unit for providing a wider scanning field suitable for finger scanning/recognition operations, and a navigation unit for providing a more concentrated scanning field suitable for finger navigation operations. The recognition lens unit may be an elongated micro lens array having a row axis substantially normal toward the light guiding array of the electronic module. The navigation unit may be a single micro lens element arranged adjoining the recognition unit and offsetting the row axis thereof.

Embodiments of the instant disclosure also provide illuminating channel arrangements that are adaptable in a small low profile optical package and capable of providing particularly arranged projection patterns to uniformly illuminate a wide scanning area.

The above characteristics of the instant disclosure will become more readily apparent to those of ordinary skill in the art after reviewing the following detailed description and the accompanying drawings.

DETAILED DESCRIPTION OF THE PREFERRED EMBODIMENTS

The instant disclosure will be described more specifically with reference to the following embodiments. It is to be noted that the following descriptions of preferred embodiments are provided herein for purpose of illustration and description. It is not intended to be exhaustive or limiting to the precise form disclosed.

Figure 1:
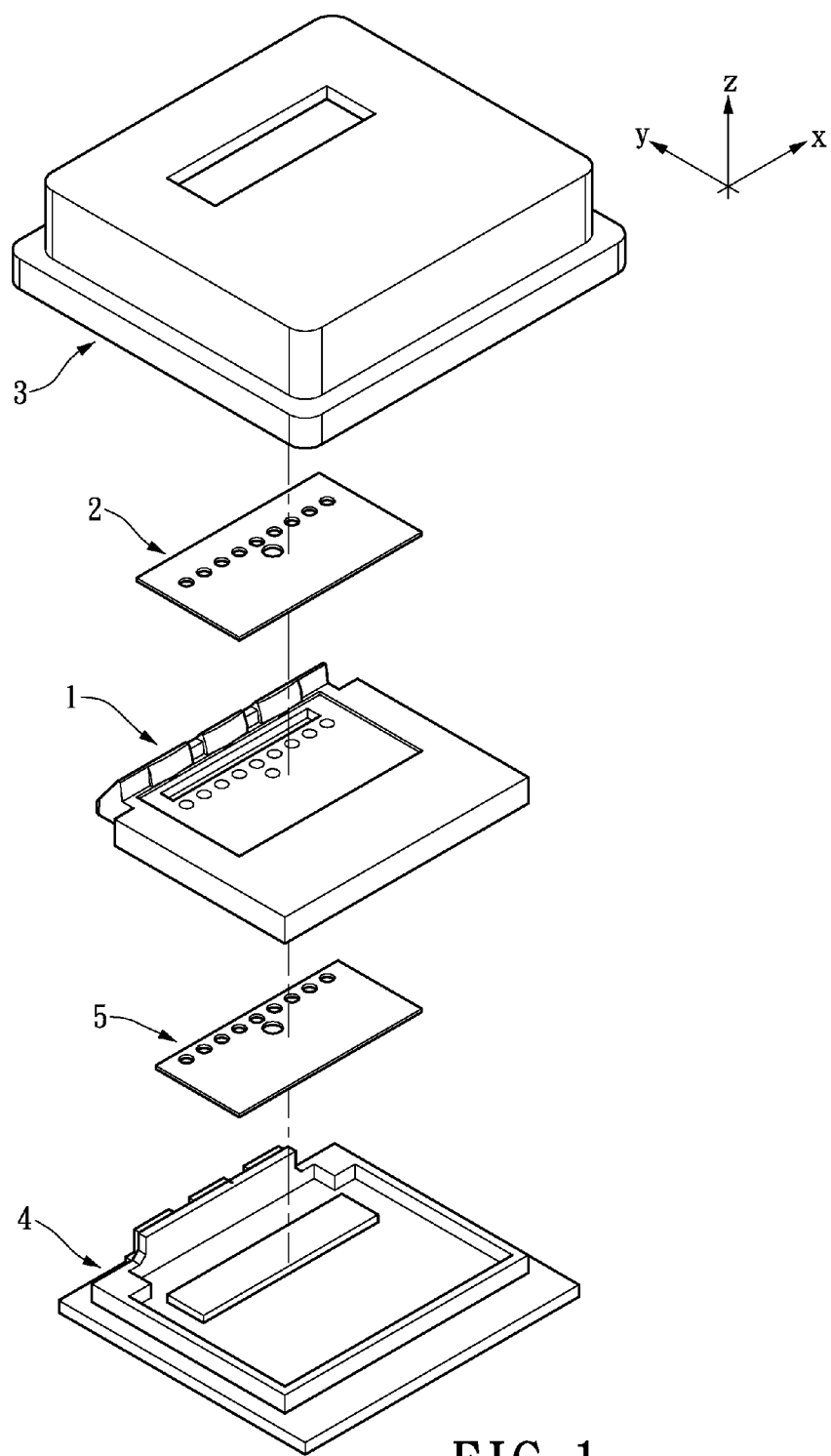
FIG. 1 illustrates an exploded overview of an optical finger sensing device utilizing an integrated optical module in accordance with the instant disclosure.

FIG. 1 depicts an exploded overview of an optical finger sensing device utilizing an integrated optical module in accordance with the instant disclosure. Particularly, the optical module discussed in the instant exemplary embodiment, together with the corresponding component arrangement of the optical finger sensing device, enable capabilities in both finger navigation and fingerprint recognition operations. From bottom to top, the sensor package of the exemplary finger sensing device generally includes an electronic module 3 having a light source unit and a light detector unit disposed on a substrate, an integrated optical module having an illuminating portion and an imaging portion correspondingly arranged on the electronic module 3, and a window module 3 having a contact surface arranged at least partially above the integrated optical module 3, with the above-mentioned components being vertically arranged in a low-profile compact package.

Figure 2:
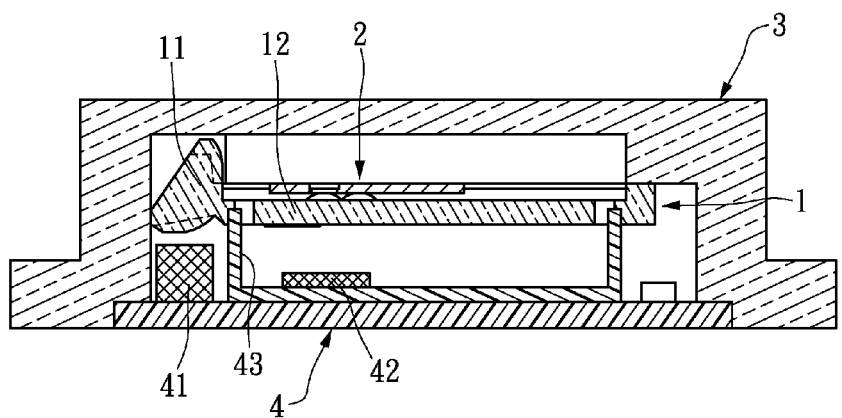
FIG. 2 illustrates a cross sectional side view of the finger sensing device utilizing an integrated optical module in accordance with the instant disclosure.
Figure 3:
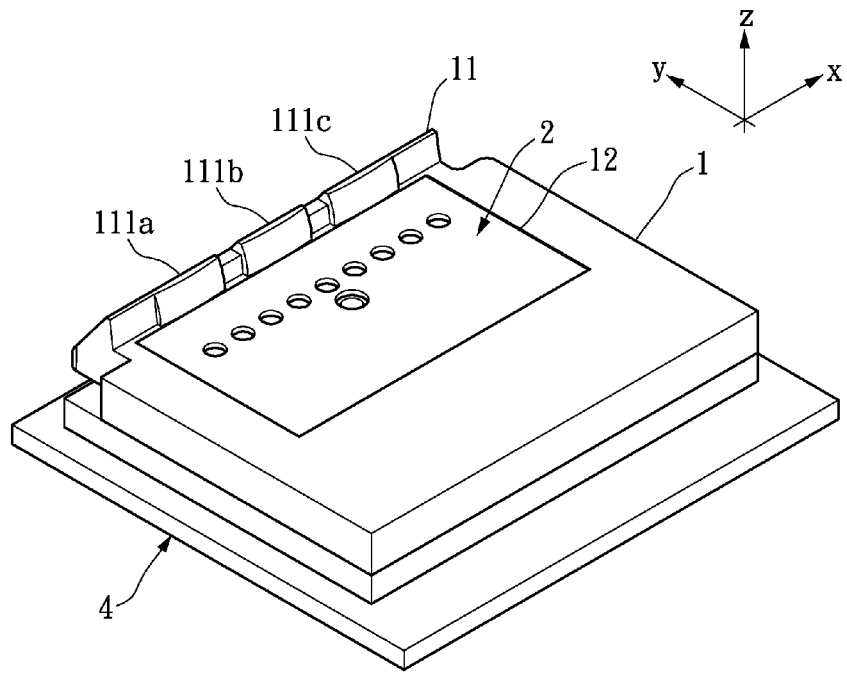
FIG. 3 illustrates a perspective view of an integrated optical module in accordance with the instant disclosure.

The general operating principle of the instant optical finger sensing device will be discussed as follows. Please refer to FIG. 2 and FIG. 3, which illustrates a cross sectional side view of an exemplary finger sensing device utilizing an integrated optical module 1 in accordance with the instant disclosure, and a perspective view of the integrated optical module 1, respectively. The light source unit 41 emits light toward a predetermined area in which the illuminating portion 11 of the optical module 1 is arranged. The light guides 111a/b/c arranged in the illuminating portion 11 of the optical module 1 direct the beam of light from the light source 41 of the electronic module 4 toward the scanning/contact surface 31 of the window module 3 at a predetermined angle of incidence to illuminate an object placed approximate the contact surface 31. Through the contact surface 31 of the window module 3, on which a human finger may be placed for scanning, the reflected light (off the finger tip) is transmitted toward the imaging portion 12 of the optical module 1. The imaging portion 12 of the optical module 1, which comprises specially arranged micro lens array 121, is configured to focus and direct the reflected light toward the light sensor unit 42 of the electronic module 4.

In the instant exemplary embodiment, the integrated optical module 1 comprises a structure that generally resembles a rectangular plate, and has an illuminating portion 11 and an imaging portion 12 respectively defined on the horizontal (X-Y) plane thereof. The compact horizontal arrangement of the illuminating and the imaging portions of the instant optical module 1 may help to reduce thickness of the module and thus maintain a lower profile of the overall sensor package. The lens material of the integrated optical module 1 may be polycarbonate or other suitable materials that are transparent to light emitted by the electronic module 4. Moreover, the optical module 1 may be a precision molded single piece optical component. The illuminating portion 11 of the optical module is arranged in correspondence to the light source unit 41 of the electronic module 4 and comprises an illuminating channel that can transmit an incoming beam of light from the light source toward the window module 3 at a suitable angle of incidence. The illuminating channel may comprise a light guiding array 111 having optical components that utilize the principle of total internal reflection (TIR) or other suitable optical reflection arrangements that can direct light emitted from the light source unit 41 toward the window module 4 to illuminate the object to be scanned. Likewise, the imaging portion 12 of the optical module is arranged in correspondence to the light detector unit 42 of the electronic module 4 and comprises in imaging channel that can direct the reflected light (off a scanned object, such as a human finger tip) from the window module 3 toward the light detector unit 42. Specifically, the imaging channel may include a micro lens array 121 designed to incorporate lens components suitable for different operation modes of the finger sensing device, including fingerprint recognition and finger navigation.

The electronic module 4 generally includes a substrate (such as a PCB) that incorporates necessary electrical components specifically configured to enable optical scanning operations, which may include a light source unit 41 (such as the light source elements 41a/b/c shown in FIG. 4) and a light detector unit 42. A photo shield structure 43 is preferably arranged between the light source unit 41 and the light detector unit 42 to prevent potential interference of optical crosstalk effect. The photo shield structure 43 thus serves as a structural boundary that separates the electronic module 4 into an illumination region and a detecting region.

The light source unit 41, which is arranged on the PCB and situated at one side of the photo shield structure 43 in the instant embodiment, may include one or more light-emitting diode (LED) as the lighting element. In one embodiment, the light source unit 41 may consist of a single lighting element having adequate output power. In this case, the high powered light source unit may be arranged in corporation with wide angle optical devices to uniformly diffuse the output light thereof toward a designated illuminating zone, so that the light can be further directed toward and projected onto the object to be scanned. In an alternative embodiment, the light source unit 41 may comprise multiple lighting elements (41a, 41b, 41c) arranged in a particular illumination array. The implementation of multiple lighting elements may reduce the output requirement for each individual lighting element and thus enhancing operational flexibility and facilitating energy saving, which is of particular importance for adapting in smaller hand held devices that operates on portable batteries. For instance, multiple lower power lighting elements can be arranged in a light source array, with each lighting element respectively configured to project light toward a predetermined area. The degree of overlapping between the lighting elements may be adjusted to suit a particular operational requirement. Moreover, each individual lighting element may be configured to activate independently to meet the actual needs of a specific mode of operation, thereby reducing overall energy consumption.

The activation of each individual lighting element in the light source array may be controlled to suit a particular mode of operation. By way of an example, not all types of imaging application require concurrent activation of all the lighting elements. For instance, fingerprint recognition applications may require the concurrent activation of all the lighting elements of the light source array to produce adequate level of illumination on a wider scanning area (in the x-axis) across the contact surface of the window module 3. One the other hand, finger navigation applications, which utilize the change of directional vector in the reflected light signal, require relatively lower level of light output and a narrower yet taller field of illumination (taller in the y direction). Accordingly, not all the lighting elements need to be activated for finger navigation operations. Thus, when carrying out a particular mode of operation that does not require full activation of the light source array, the electronic module 4 may be configured to activate only portions of the light source array for illuminating a specific portion of the contact surface. Furthermore, a properly arranged multi-element light source array may promote uniform light output intensity across the designated illumination region, and therefore is a preferred choice for the instant embodiment.

Figure 4:
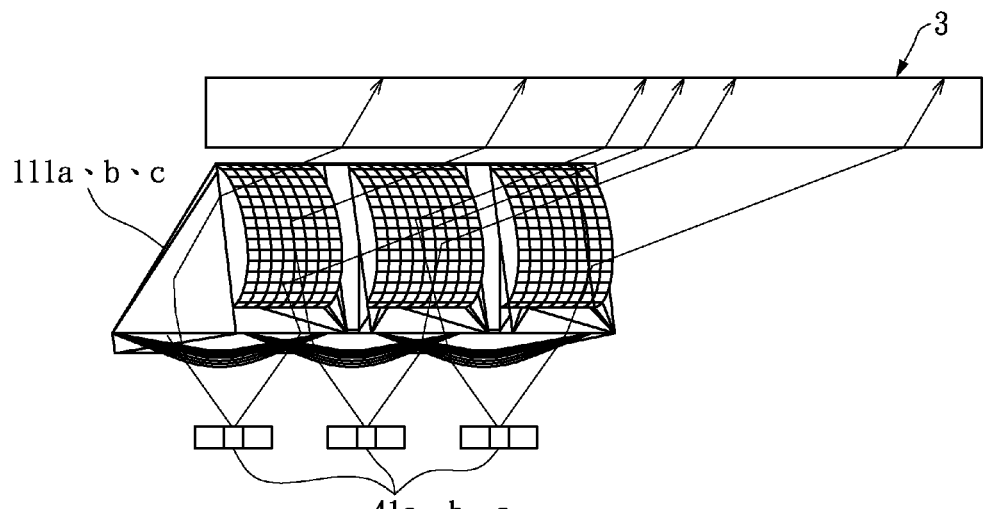
FIG. 4a illustrates the illumination portion of an integrated optical module in accordance with the instant disclosure.

For example, the instant embodiment utilizes a light source array comprising three lighting elements arranged in a single row configuration (as better shown in FIG. 4). When operating in fingerprint recognition mode, all three lighting elements in the array will be activated to generate adequate luminance across a wider stripe area on the contact surface of the window module 3. On the other hand, when operating under finger navigation mode, only the center lighting element 41*b* is required to illuminate the center portion of the scanning surface. The change of directional vector in the reflected light signal, which corresponds to the movement of the finger tip, will be directed toward the imaging portion 12 of the optical module 1. The imaging lens array 121 arranged in the imaging portion 12, whose detail will be discussed in a later section, is configured to focus the reflected light from the window module 3 onto the light detector unit 42 of the electronic module 4.

The light detector unit 42, which is arranged in the detecting region of the electronic module 4 on the other side of the photo shield structure 43, may comprise one or more photo-sensor capable of generating two-dimensional image of an scanned object, such as DFN/QFN (dual/quad flat no lead) packaged photo diodes. Practically, the light detector unit 42 may include a plurality of photo detectors arranged in a sensor array that corresponds to the imaging lens array 121 of the optical module 1, whose detail will be discussed in a later section. The electronic module 4 may comprise a suitably designed seat member on the window-facing surface thereof to provide secure structural support for the optical module 1. As shown in the instant embodiment, a ring-like seat member (which the photo shield structure 43 is a part of) is arranged around the light detector unit 42 on the detecting region of the electronic module 4. This enclosing ring structure not only can serve as a micro lens tray for retaining the optical module 1 but also function as an extended photo shield for more effective crosstalk prevention.

The window module 3 may be arranged to serve as an upper housing for the optical finger sensing device. The window module 3 may have a contact surface (typically the top surface) on which a human finger may be placed (and slide over) for detection. The contact surface may include a scanning window transparent to light of a particular wavelength range corresponding to the light source output of the electronic module 4. The contact surface may be flat, or preferably, have a slight curvature. For example, convex curvature on the top portion of the contact surface helps to increase the sensing area that is in focus for capturing an image of the finger pressed thereon. The window module 3 may be formed of glass or other wear resistant materials that are transparent to the light emitted from the light source unit 41. The scanning window may be a separate piece of optical component disposed on the window module 3, or made as an integral part of the window module 3. For instance, the window module 3 may be entirely made of a transparent material. Accordingly, suitable coating materials may be applied to cover the body of the window module 3, exposing only a desired transparent portion thereof in forming the scanning window. The scanning window may be elongated in shape and have an area less than that of a human finger tip in at least one dimension. Moreover, at least a portion of the scanning window (which has an axis of elongation) may preferably be widened in a direction orthogonal to its direction of elongation. The widened window area would preferably be corresponding to the micro lens array 121 of the optical module 1 to aid the light detecting performance in finger navigation mode.

Figure 6:
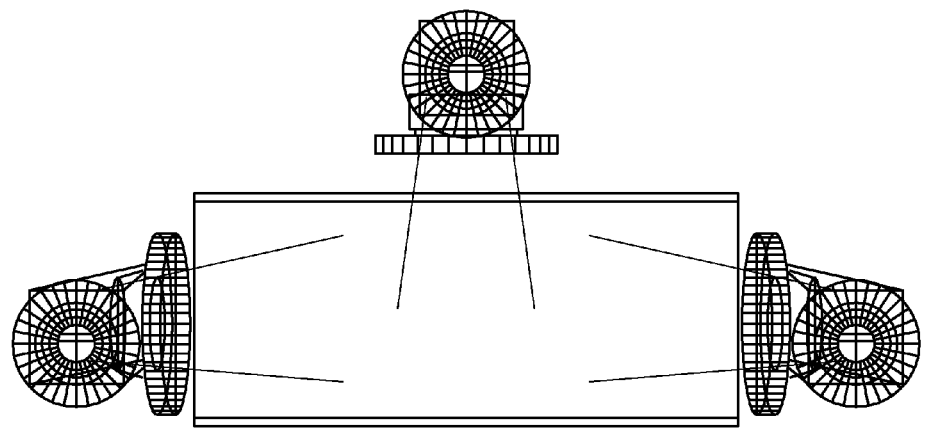
FIG. 6 shows the illumination optics arrangement of one embodiment in accordance with the instant disclosure.

The optical and structural layout of the illuminating portion 11 of the instant exemplary optical module 1 is correspondingly designed to match the arrangement of the light source unit 41 and cooperatively define an illumination channel. Please refer to FIGS. 4 and 6, which illustrate embodiments of the illumination portion 11 of an integrated optical module in accordance with the instant disclosure. To obtain a good finger pattern, miniaturized light guiding components are implemented in particular arrangements to generate included collimated beams of light tailored in a desired projection pattern for illuminating the scanning window of the window module 3. The illumination channel may be established by a light guiding array comprising optical components that facilitate uniform projection of incident light from the light source 41 toward the scanning window of the window module 3. Particularly, the instant exemplary embodiment employs a light guiding array having three adjacently arranged prism members 111*a/b/c*, with the light exiting surface thereof arranged toward the imaging portion 12. Moreover, the optical components of the instant embodiment (for example, the prisms 111*a/b/c*) are arranged in a singular row configuration with the row axis thereof extending in a direction substantially parallel to the elongated axis of the scanning window. The light guiding array in accordance with the instant disclosure allows the adaptation of a more congregated light source arrangement on the electronic module 4 for better space saving, at the same time enables uniform illumination across a wide area of scanning surface. Alternatively, the light guiding array may be arranged in a horizontally spread out configuration around the scanning window, as shown in FIG. 6. This arrangement may distribute a more controlled illuminated pattern across the scanning surface at wider intervals.

Figure 5:
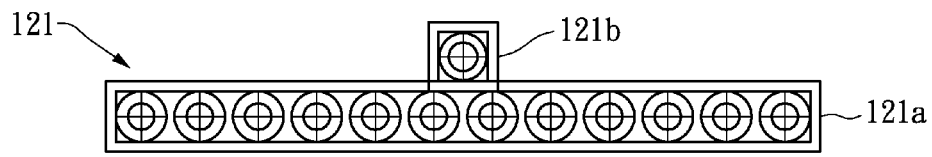
FIG. 5 illustrates the imaging portion of an integrated optical module in accordance with the instant disclosure.

The imaging portion 12 of the instant optical module 1, which is arranged in correspondence to the light detector unit 42 of the electronic module 4, comprises a micro lens array 121 capable of directing and focusing reflected light off a scanned finger tip from the window module 3 toward the light detector unit 42. Particularly, the imaging portion 12 constitutes a part of an imaging channel for directing the reflected light off a scanned object to the electronic module 4 for image capture. Please refer to FIG. 5 for a closer look of the imaging portion 12 of an exemplary optical module in accordance with the instant disclosure. In the instant embodiment, the micro lens array 121 is arranged in the central region of the rectangular optical module plate, and comprises an elongated recognition lens unit 121a and an adjoining navigation lens unit 121b. The recognition lens unit 121a comprises a plurality of micro lens elements arranged in an elongated row array. The elongated recognition lens array 121b has an axis of elongation extending in the X direction. Preferably, the axis of extension (or, the row axis) of the recognition lens unit 121a is substantially perpendicular to the light emitting surface of the prisms 111a/b/c (of the light guiding array) and substantially parallel to the scanning window of the window module 3. On the other hand, the navigation lens unit 121b comprises a concentrated congregation of lens elements arranged adjoining the recognition array 121a and offsetting the axis of elongation thereof. In the instant embodiment, the lens element of the navigation unit 121b utilizes a single micro lens arranged approximate the middle portion of the elongated recognition unit 121a to cover one or more corresponding photo diode(s).

Preferably, the navigation unit 121b is arranged corresponding to the widened window area of the window module 3 for establishing a wider field of view suitable for sensing finger movements in finger navigation operations. Please note that, although the central placement of the navigation lens unit 121b and the widened navigation window discussed herein is preferable for general navigation operations, the exact position and arrangement of the navigation lens unit 121b and the corresponding navigation window thereof may nonetheless be arranged in other configurations to suit specific design and/or operating requirements. For instance, the navigation lens unit 121b may be arranged in a fashion that is skewed toward the right end (in the positive X direction) of the elongated recognition lens array 121a for better adaptation to right thumb operations in finger navigation mode. Furthermore, the imaging portion 12 of the optical module 1 may incorporate photo shielding structure to reduce potential interference from optical crosstalk effect. For example, light impermissible coating may be applied to the imaging portion 12 around the micro lens array 121. The application methods of the light blocking layer may include electro-less plating and/or other suitable techniques.

Unlike conventional optical arrangements that utilize separated illuminating and imaging optics components, the integrated optical module in accordance with the instant disclosure occupies less precious space and is capable of generating more uniformed illumination output. Moreover, by integrating technical features required by both the finger navigation and fingerprint recognition operations into a small one piece package, the instant disclosure can realize multi-purpose optical operations in a cost effective and space saving manner.

The coupling arrangement of the micro lens elements in the micro lens array 121 and the photo sensor elements in the light detector unit 42 may depend on specific operational requirements or other design factors. For instance, in one embodiment, the each micro lens element in the micro lens array 121 may be paired with a photo diode of the light detector unit 42 in a one to one fashion. In other embodiments, each micro lens element in the micro lens array 121 may be correspondingly coupled to multiple photo sensor elements, or vice versa. Specifically, the special micro lens arrangement of the instant disclosure allows each micro lens of the lens array 121 to be designed to cover a designated number of photodiodes, thus reducing structural complexity of the optical component yet at the same time maintaining effective light transmitting and focusing capabilities. Further-more, the positioning and interspacing of the lenses are designed to facilitate the reduction of object data overlap.

Please refer back to FIG. 1. Additional photo shielding members, such as an upper photo shield 2 and a lower photo shield 5, may be adapted to reduce interference from possible optical crosstalk effects and improve sensor performance of the instant finger sensing device. In the instant exemplary embodiment, each of the upper and the lower photo shields (2 & 5) is generally planar in shape, with each shield having an aperture array arranged on the plane surface thereof. The aperture array is arranged in correspondence to the layout of the micro lens array 121. Particularly, the size and the structural configuration of the apertures may determine the field of view (FOV) of individual micro lens, and moreover help to reduce optical cross talk. For achieving better structural integrity for mounting the upper/lower photo shields 2/5, the integrated optical module 1 may be configured to include a recessed structure in the imaging portion 12. For example, in the instant embodiment, the optical module 1 has a recessed structure configured in the imaging portion 12 with the micro lens array 121 arranged in the recessed structure. The recessed structure on the planar surface of the optical module 1 may serve as a mounting tray for secure coupling of the photo shielding members. Nevertheless, the adaptation of the photo shields (especially the lower photo shield 5) may be optional, and the actual implementation of the photo shielding members should depend on specific structural arrangement and/or other operational requirements.

While the invention has been disclosed with respect to a limited number of embodiments, numerous modifications and variations will be appreciated by those skilled in the art. It is intended, therefore, that the following claims cover all such modifications and variations that may fall within the true spirit and scope of the invention.

What is claimed is:

1. An integrated optic module mediating a window module having a contact surface and an electronic module having a light source and a light detector, comprising:
   an illumination portion including an light guiding array arranged to direct incident light from the light source toward the window module at a predetermined angle of incidence; and
   an imaging portion having a micro-lens array arranged thereon for directing reflected light from the window module toward the light detector, wherein the micro-lens array includes
   an elongated recognition unit having a row axis substantially normal toward the light guiding array and
   a navigation unit adjoining the recognition unit and offsetting the row axis thereof.

2. The optical module of claim 1, wherein the light guiding array comprises at least three optical members surroundingly arranged around the micro lens array.

3. The optical module of claim 1, wherein the light guiding array comprises at least three optical members adjacently arranged toward the imaging portion.

4. The optical module of claim 1, wherein the recognition unit comprises a plurality of micro lens elements arranged in a single row configuration.

5. The optical module of claim 1, wherein the navigation unit comprises a single micro lens.

6. The optical module of claim 5, wherein the navigation unit is arranged proximate the middle portion of the elongated recognition unit.

7. The optical module of claim 1, the optical module having a substantially planar body, wherein the illumination portion and the imaging portion are of a one piece molded construction.

8. The optical module of claim 1, wherein the imaging portion includes a shielding structure.

9. The optical module of claim 8, wherein the shielding structure includes a crosstalk prevention layer.

10. The optical module of claim 1, wherein the imaging portion thereof includes at least one recessed tray structure for coupling a photo shield.

11. A finger scanning apparatus, comprising:
 a window module having a contact surface against which a finger is placed for scanning;
 an electronic module comprising a light source and a light sensor correspondingly arranged toward the window module; and
 an integrated optic module mediating the window module and the electronic module, the optic module comprising
  an illumination portion including an light guiding array arranged to direct light from the light source toward the window module at a predetermined angle of incidence, and
  an imaging portion having a micro-lens array arranged thereon to direct reflected light from the window module toward the light detector, wherein the micro-lens array includes
   an elongated recognition unit having a row axis substantially normal toward the light guiding array and
   a navigation unit adjoining the recognition unit and offsetting the row axis thereof.

12. The finger scanning apparatus of claim 11, wherein the light guiding array comprises at least three optical members adjacently arranged toward the imaging portion.

13. The finger scanning apparatus of claim 11, wherein the recognition unit comprises a plurality of micro lens elements arranged in a single row configuration.

14. The finger scanning apparatus of claim 11, wherein the navigation unit comprises a single micro lens.

15. The finger scanning apparatus of claim 14, wherein the navigation unit is arranged proximate the middle portion of the elongated recognition unit.

16. The finger scanning apparatus of claim 11, the optical module having a substantially planar body, wherein the illumination portion and the imaging portion are of a one piece molded construction.

17. The finger scanning apparatus of claim 11, wherein the imaging portion includes a shielding structure.

18. The finger scanning apparatus of claim 17, wherein the shielding structure includes a crosstalk prevention layer.

19. The finger scanning apparatus of claim 11, further comprising a photo shield member disposed on a surface of the imagine portion of the integrated optical module and arranged substantially in alignment with the micro lens array.

20. The finger scanning apparatus of claim 19, wherein the photo shield member is disposed at least partially between the window-facing surface of the imaging portion and the contact surface of the window module.

21. The finger scanning apparatus of claim 20, wherein the photo shield member is disposed at least partially between the photo-detector-facing surface of the imaging portion and the electronic module.

22. The finger scanning apparatus of claim 11, wherein the light guiding array comprises at least three optical members surroundingly arranged around the micro lens array.

23. The finger scanning apparatus of claim 22, wherein the light source of the electronic module includes at least three lighting elements arranged around the micro lens array in correspondence to the light guiding array of the optical module, wherein at least one of the lighting element is arranged in correspondence to the navigation unit of the optical module.

* * * * *